(12) United States Patent
Stephens et al.

(10) Patent No.: US 7,197,315 B1
(45) Date of Patent: Mar. 27, 2007

(54) METHOD AND APPARATUS TO SELECT A CHANNEL USING PERFORMANCE METRICS

(75) Inventors: Adrian P. Stephens, Cambridge (GB); Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 10/637,335

(22) Filed: Aug. 8, 2003

(51) Int. Cl.
*H04M 7/20* (2006.01)

(52) U.S. Cl. .................. 455/450; 455/509; 455/464

(58) Field of Classification Search ............. 455/450, 455/509, 464; 370/329, 341, 431
See application file for complete search history.

(56) References Cited

U.S. PATENT DOCUMENTS

| | | | |
|---|---|---|---|
| 6,175,739 B1 * | 1/2001 | Ishii et al. ............... | 455/452.1 |
| 6,487,418 B1 * | 11/2002 | Magana et al. ............. | 455/464 |
| 6,498,935 B1 * | 12/2002 | Cannon et al. ............. | 455/464 |
| 6,516,192 B1 * | 2/2003 | Spaur et al. ................ | 455/450 |
| 2003/0039266 A1 * | 2/2003 | Hojo et al. ................. | 370/465 |
| 2003/0181211 A1 * | 9/2003 | Razavilar et al. ........... | 455/450 |
| 2004/0185864 A1 * | 9/2004 | Balachandran et al. .. | 455/452.2 |
| 2004/0203808 A1 * | 10/2004 | Mathur ....................... | 455/450 |
| 2004/0248580 A1 * | 12/2004 | Backes et al. .............. | 455/450 |

* cited by examiner

*Primary Examiner*—Joseph Feild
*Assistant Examiner*—S. Smith
(74) *Attorney, Agent, or Firm*—The Law Offices of John C. Scott, LLC

(57) ABSTRACT

A method and apparatus to select a channel of operation for a wireless network device may examine channels supported by the device to gather information regarding present use of the channels. A best channel may be determined for the wireless network device by identifying a channel that maximizes a predetermined performance metric.

24 Claims, 3 Drawing Sheets

METHOD AND APPARATUS TO SELECT A CHANNEL USING PERFORMANCE METRICS

FIELD OF THE INVENTION

The invention relates generally to wireless communications and, more particularly, to wireless networks.

BACKGROUND OF THE INVENTION

The popularity of portable computing devices has fueled the demand for wireless networking solutions. A multitude of wireless networking standards now exist, and others are in development, that each set up a framework for the operation of a wireless network. Many of these standards utilize the same or similar portions of the electromagnetic spectrum as other standards. Some new wireless networking standards provide for the simultaneous use of a particular channel by devices following different standards. Typically, these newer standards will include some form of "protection mechanism" to support this simultaneous use by disparate devices. However, such protection mechanisms may carry a performance penalty that reduces the efficiency with which the available spectrum is utilized.

DETAILED DESCRIPTION

Figure 1:
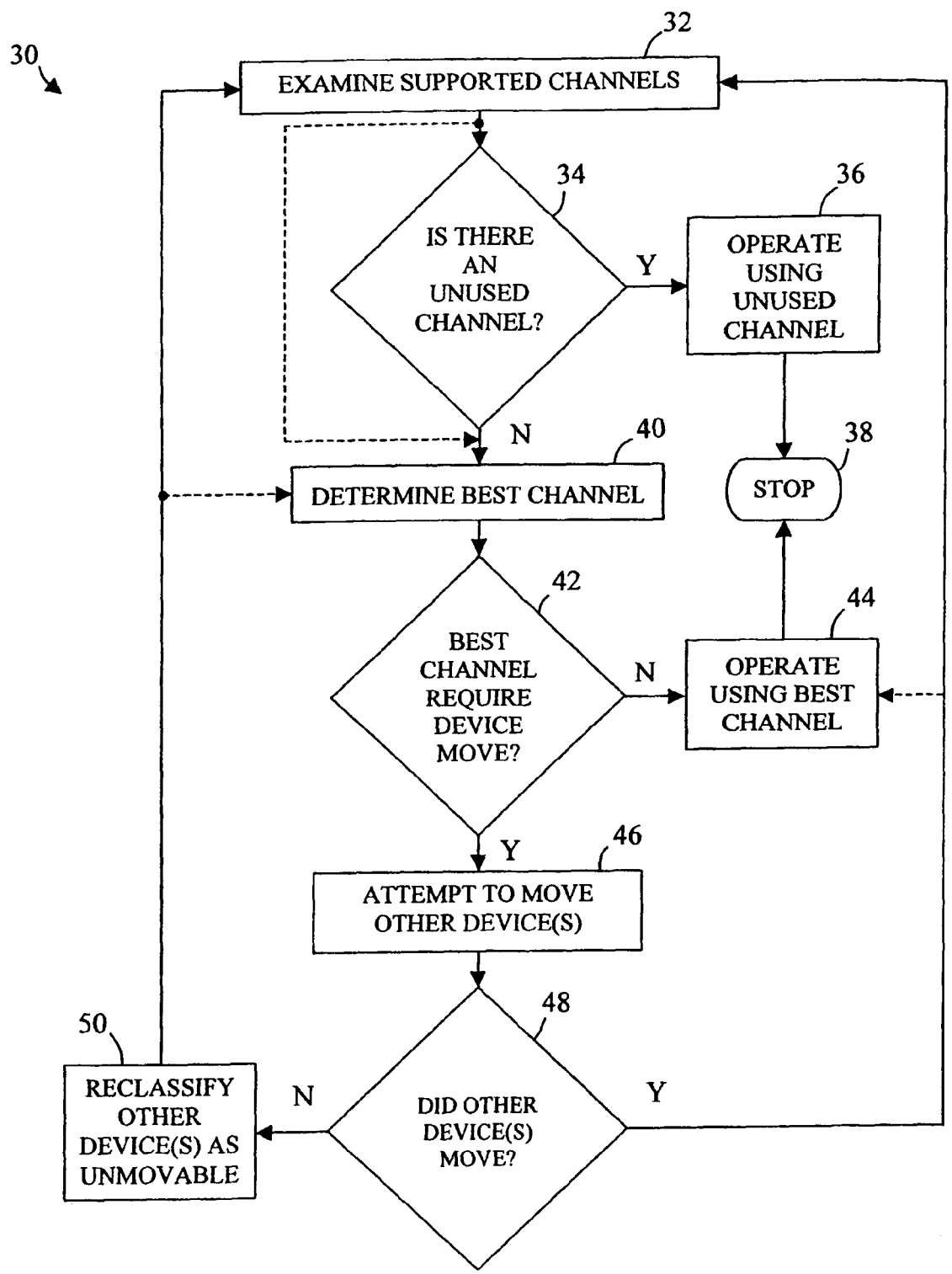
FIG. 1 is a flowchart illustrating an example method for selecting a channel of operation for a wireless device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures for selecting a channel of operation (for example, defined by frequency and/or coding) for a wireless network device. The wireless network device may be any type of wireless device that can be used in a wireless network and that may need to select a channel of operation from a number of supported channels. For example, in some embodiments, the wireless network device may include a wireless access point that needs to select a channel of operation for communicating with one or more client devices in a vicinity thereof. In other embodiments, the wireless network device may include a wireless client device (e.g., a laptop, desktop, palmtop, or tablet computer having wireless networking functionality, a personal digital assistant (PDA) with wireless networking functionality, a cellular telephone or other handheld wireless communicator, a pager, and/or others) that needs to select a channel of operation in, for example, an ad hoc network scenario. Other types of wireless network device also exist. In some scenarios, one or more other wireless devices will be communicating in the vicinity of a wireless network device and will be using portions of the spectrum that are within or used by the supported channels of the wireless network device. It is desirable that the wireless network device take these other devices into account in making a channel selection.

FIG. 1 is a flowchart illustrating an example method 30 for selecting a channel of operation for a wireless network device in accordance with an embodiment of the present invention. First, a number of channels supported by a wireless network device are examined to gather information regarding the present use of the channels (block 32). During the examination of a supported channel, information such as, for example, the fraction of time that the channel is busy; the types of devices that are currently operating on the channel (e.g., the wireless standards followed by the devices, whether the devices are legacy devices or non-legacy devices, etc.); whether or not a device presently using the channel is movable to another channel; and/or other channel use information may be collected. The fraction of time a channel is busy may be determined in a number of different ways. In one approach, for example, the fraction of time that the energy within the channel exceeds a predetermined threshold level is measured. Other techniques may also be used. The types of networks on a channel and/or the movability thereof may be determined, for example, by monitoring beacon signals transmitted by other network devices in the vicinity. A network device may be classified as movable if, for example, the device supports a protocol that allows it to be moved to another channel (e.g., IEEE 802.11h and/or others).

Based on the examination of the supported channels, it is determined whether one or more of the supported channels are unused (block 34). If so, the wireless network device is allowed to operate on an unused channel (block 36) and the method terminates (block 38). If there are no unused channels, a "best channel" is next determined for use by the wireless network device by identifying a channel that optimizes a predetermined performance metric (block 40). As will be described in greater detail, any of a wide variety of different performance metrics may be used. The best channel determined for a wireless network device may or may not require that one or more other devices in the surrounding environment be moved to a channel other than the one they are presently using. That is, it may be determined that it is "best" to move one or more devices currently occupying one channel to one or more other channels so that the wireless network device can use the first channel. If the best channel determined above does not require that another device be moved to another channel (block 42), the wireless network device is allowed to operate on the best channel (block 44) and the method is terminated (block 38). However, if the best channel requires that one or more other devices be moved (block 42), an attempt is then made to move the other device(s) (block 46).

If the attempt to move the other device(s) is successful (block 48), the method may repeat starting at block 32 with another examination of the supported channels. If the channel from which the other device (or devices) was moved is now unused, the wireless network device will be allowed to operate on the unused channel (block 36) and the method will terminate (block 38). Otherwise, another best channel determination will be performed (block 40). In an alternative approach, the method 30 may return directly to block 44 after a move attempt is successful and the wireless network device may immediately begin operation using the best channel determined previously. If the attempt to move a device to another channel is not successful (block 48), the device may be reclassified as an unmovable device (block 50). The method 30 may then return to block 32 and another examination of the supported channels is performed. During the new examination, the new classification of the device is not changed (i.e., it remains unmovable even if the examination determines otherwise). In an alternative approach, the method 30 may return directly to block 40 after device reclassification and another best channel determination is made using the new device classification(s).

As illustrated in FIG. 1, in one possible variation of the method 30, the block 34 may be bypassed so that the best channel determination is made immediately after the examination of the supported channels. If one or more of the supported channels are unused, one of the unused channels will typically be selected as the "best channel" using this approach.

In at least one embodiment of the invention, the wireless network device that is selecting a channel follows a wireless networking standard that includes a protection mechanism to support channel sharing with one or more devices following other wireless networking standards. For example, the wireless network device may be a high throughput device following the standard defined by IEEE 802.11 task group n (IEEE 802.11 n). The devices that the wireless network device attempts to move may be devices that follow a different wireless networking standard than the wireless networking device of interest (e.g., legacy devices that do not include a protection mechanism, such as devices following IEEE 802.11a, b, g, etc.). Other arrangements may alternatively be used.

In at least one embodiment of the present invention, one or more mechanisms are implemented to ensure timely operation of the method 30 of FIG. 1. For example, in one approach, a timer is initiated when the method starts. The timer may include, for example, a count down timer. Then, if the timer expires before the method terminates, the best channel that does not require another device to be moved is selected for the wireless network device. In this manner, an upper limit is placed on the total duration of the method. In other possible approaches, limits may be placed on, for example, the number of channels that a wireless network device may attempt to clear and/or the number of devices that a wireless network device may attempt to move. Other techniques are also possible.

The method 30 of FIG. 1 may be performed, for example, during the initiation of a wireless network device to select a channel of operation before actual communication is commenced. In addition, or alternatively, the method 30 (or a variant thereof) may be implemented after communication has commenced, if one or more conditions are detected that require a channel change. For example, in at least one embodiment, a wireless network device may monitor its selected channel after communication activity has already begun to determine whether any other devices have started to operate on the channel. A wireless network device can monitor the arrival of other devices by, for example, receiving and analyzing the management frames of the other devices, observing one or more quality metrics that are sensitive to interference created by other devices, and/or using other techniques. If the arrival of a movable device is detected, the wireless network device may attempt to move the other device off its channel. If the arrival of an unmovable device is detected, or if an attempt to move a movable device fails, the wireless network device may select a new channel of operation (using, for example, method 30 of FIG. 1).

A wireless network device may attempt to move another device in a variety of different ways. For example, in one possible approach, a move attempt may be made through a management exchange (using, for example, IEEE 802.11h signaling, etc.). Other techniques also exist. In some cases, the signaling used by other devices may be incompatible with that of the wireless network device of interest. In such a case, one or more techniques may be implemented to facilitate detection of other devices. For example, in one approach, rudimentary detection of the presence of other devices (e.g., legacy devices) may be performed by detecting energy within a channel that is consistent with the characteristics of the other device. For example, a frequency domain power spectral density (PSD) with a shape consistent with the transmit mask of a particular type of device may be detected. In another approach, a forward error correction (FEC) metric may be used to detect another device. For example, some FEC systems may exhibit recognizable changes in internal metrics that may be used to detect the presence of an interfering device. In a multicarrier system, the system may exhibit a lower signal to noise ratio (SNR) on subcarriers experiencing interference due to the presence of a legacy device. Comparison to non-interfered subcarrier SNRs can be used to provide a metric for detection of the legacy device.

If the wireless network device of interest is a wireless access point, the device may cease operation of its current network when attempting to detect other devices so that the protocols of the devices do not confuse or collide with one another. The wireless network device may, for example, command one or more client devices to enter a quiet mode in which they do not transmit for some specified period of time. This may be achieved via a medium access control (MAC) mechanism, which may be a new instruction, or some other reliable means. The client devices may need to cease transmit activity only long enough for the wireless network device to complete the required detection activity or transactions with the other device(s). In another possible approach, a wireless network device may revert to another mode of operation (to another wireless networking standard) in order to communicate with one or more other devices. If possible, the wireless network device may persuade or command another device to move to another channel that is not occupied by the current network or that can provide service to the other device. The wireless network device may revert to the other mode during, for example, the quiet mode described above or at other times. After moving another device out of a channel of interest, the wireless network device may return to a normal mode of operation and restart its network with the current client devices. This may be achieved, for example, by letting a "be quiet" timer expire that was previously set when the quiet mode was initiated.

In another technique, the network may be actively restarted by issuing an appropriate command or by some other means.

Any of a wide variety of performance metrics may be used during the determination of the best channel. In at least one embodiment, the performance metric that is used is an estimate of "aggregate throughput," which is the sum of the estimated throughputs of the supported channels. As described above, in at least one embodiment of the invention, the wireless network device that is selecting a channel may follow a wireless networking standard that includes a protection mechanism that facilitates channel sharing with one or more other devices. The protection mechanism, however, may involve a performance penalty when the other device(s) in the channel follows a different wireless networking standard than the device of interest (e.g., legacy devices). For a channel that contains only legacy devices, the estimated throughput of the channel may be calculated by, for example, multiplying the observed channel load by the legacy device maximum supported rate. In another approach, the estimated throughput of a channel that includes only legacy devices may be calculated by observing the distribution of actual rates used and determining an average. For a channel that contains only wireless network devices that support a protection mechanism, the estimated throughput may be calculated by, for example, multiplying the observed channel load by the maximum supported rate of these devices. In another approach, the estimated throughput of a channel that includes only devices that support the protection mechanism may be calculated by observing the distribution of actual rates used and determining an average. Other throughput estimation techniques also exist. For a channel that contains a mixture of legacy devices and non-legacy devices, the channel load must be split in some way (e.g., equally, in proportion to the number of networks or stations, etc.) between the legacy and non-legacy devices. Also, in the mixed network case, the rate value used for the non-legacy devices should include the overhead effect of any protection mechanism that has to be used. The protection mechanism may include any signaling necessary to ensure coexistence of the legacy and non-legacy devices.

Figure 2:
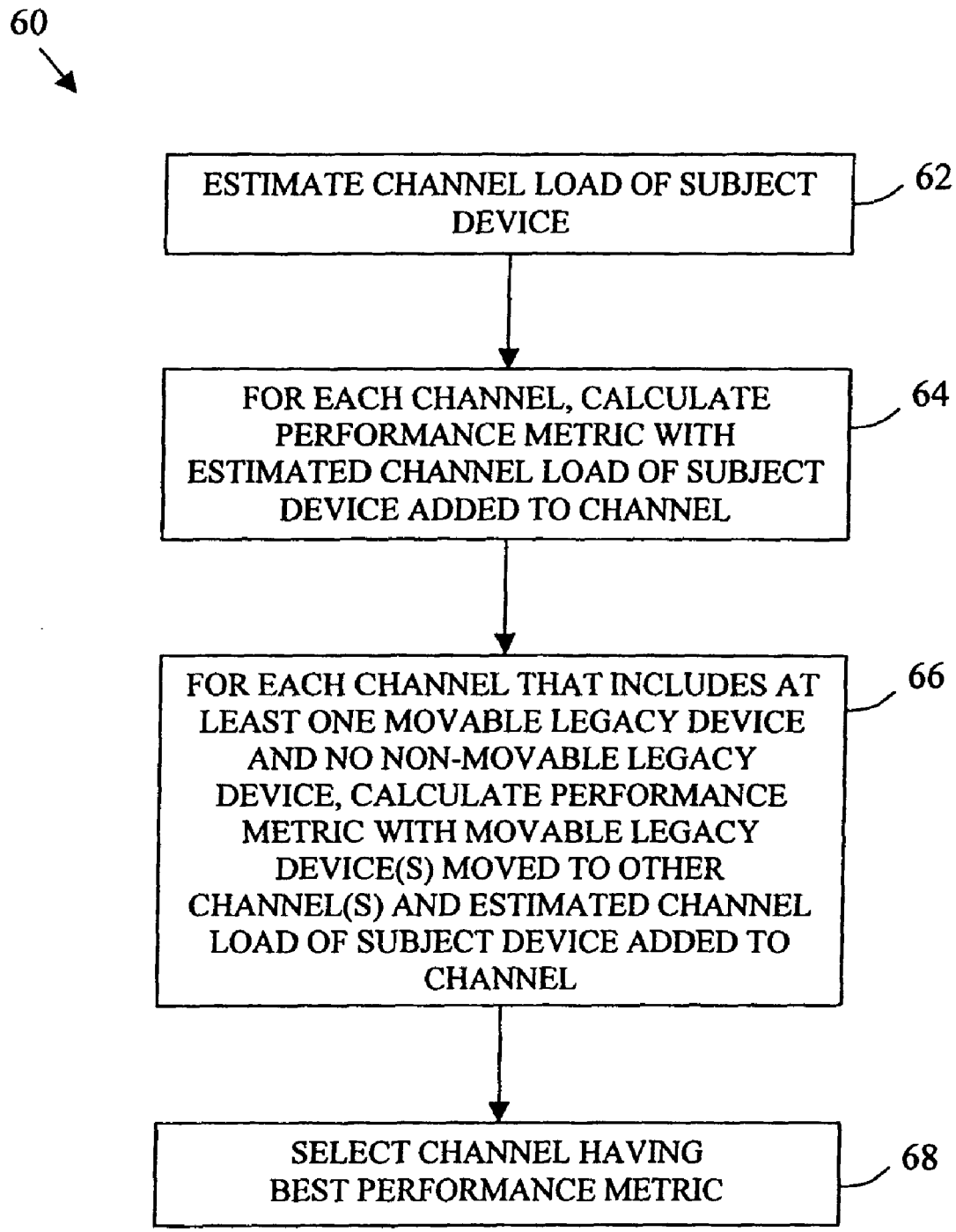
FIG. 2 is a flowchart illustrating an example method for determining a best channel to be used by a wireless device in accordance with an embodiment of the present invention.

FIG. 2 is a flowchart illustrating an example method 60 for determining a "best channel" to be used by a wireless network device in accordance with an embodiment of the present invention. The method 60 may be used, for example, in block 40 of the method 30 of FIG. 1 or in other channel selection methods. First, a channel load of a subject network device is estimated (block 62). The channel load of the subject device may be estimated based on, for example, observations during previous periods of operation. If there is no previous knowledge of the channel load, then a 100% figure (or some other figure) may be used. Other channel load estimation techniques also exist. After the channel load has been estimated for the network device, performance metrics are calculated. Performance metrics are first calculated for situations where no devices are moved. For each of the channels supported by the wireless network device, a performance metric value is calculated with the estimated channel load of the subject device added to that channel (block 64). For example, in a system that uses aggregate throughput as a performance metric, a first performance metric value may be calculated as a sum of the estimated throughputs of all of the supported channels with the estimated channel load of the subject device in a first of the channels, a second performance metric value may be calculated as a sum of the estimated throughputs of the supported channels with the estimated channel load of the subject device in a second of the channels, and so on. Channel loads will typically be capped at 100% after the subject device load is added. Other performance metrics may alternatively be used.

Performance metric values are next calculated for situations that involve the movement of one or more devices to one or more other channels. A performance metric value may be calculated for each of the supported channels that includes at least one movable legacy device and no unmovable legacy devices (block 66). To calculate each of these performance metric values, it is assumed that the movable legacy devices within a corresponding channel are moved to one or more other channels (i.e., an estimated channel load of each legacy device is removed from the corresponding channel and added to another channel, with the load of the other channel being capped at 100%) and the estimated channel load of the subject network device is added to the corresponding channel (and capped at 100%). For example, in a system that uses aggregate throughput as a performance metric, a first performance metric value may be calculated as a sum of the estimated throughputs of all of the supported channels with the estimated channel load of the subject device in a first channel and all of the legacy devices within the first channel moved to other channels, a second performance metric value may be calculated as a sum of the estimated throughputs of the supported channels with the estimated channel load of the subject device in a second channel and all of the legacy devices within the second channel moved to other channels, and so on for each channel that includes at least one movable legacy device and no unmovable legacy devices. Any of a number of different approaches may be used to determine where to move a particular legacy device to calculate the performance metric value. In one approach, for example, a legacy device within a channel of interest is moved to the least loaded channel that contains only legacy devices. Other techniques for moving a legacy device also exist. By moving legacy devices, situations that involve a performance penalty may be avoided. In other embodiments, non-legacy devices may be moved.

After the performance metric values have been calculated as described above (in blocks 64 and 66), the best performance metric value (e.g., the highest value) is selected and the corresponding channel is deemed the "best channel." Thus, the best channel selected in this manner may require one or more legacy devices to be moved from their present channels to other channels (e.g., if the highest performance metric value was calculated in block 66).

To speed up the best channel determination, limits can be placed on the number of performance metric values that are calculated. For example, in block 66, instead of calculating a performance metric value for each of the supported channels that includes at least one movable legacy device and no unmovable legacy devices, a performance metric may be calculated for each channel that includes at least one but less than, for example, three movable legacy devices and no unmovable legacy devices. Thus, an upper limit is placed on the number of legacy devices that will be moved. Other such limits are also possible. Alternative selection criteria may also be implemented. For example, instead of just selecting the highest performance metric value, some preference may be given to channel selections that do not require a legacy device move. This may be accomplished, for example, by adding a predetermined value to each of the performance metric values calculated in block 64 of method 60. In addition, as described above, performance metrics other than aggregate throughput may be used. For example, in at least one embodiment, a performance metric is used that considers its own throughput to be more important than that of other networks. In one such approach, for example, a performance metric may be defined to be a weighted sum of the subject device's own estimated throughput in a channel and the aggregate throughput. By adjusting the weighting, the degree of self-preference of the subject device may be adjusted. In addition, as described previously, instead of using an estimate of the load of the subject device based on expectation, the subject device may assume that it can fully utilize any unused capacity of the channel it selects.

In some high throughput network devices, the device is capable of using one of several wider channels that overlaps multiple legacy channels (for example, when channels are specified by a frequency position and width, the frequencies occupied by a wide channel may include those frequencies occupied by multiple legacy channels). When using such a device, block 34 of the method 30 of FIG. 1 may be modified to require that a channel position be unused at the widest supported width for that channel position to be selected. Also, when evaluating the performance metrics, all of the possible channel widths may be examined in turn and the width that gives the highest performance metric may be selected. In considering a channel and width that overlaps an existing high throughput network device, it may be desirable to allow only an exact match of channel and width, thus preventing two high throughput networks from partially overlapping each other.

Figure 3:
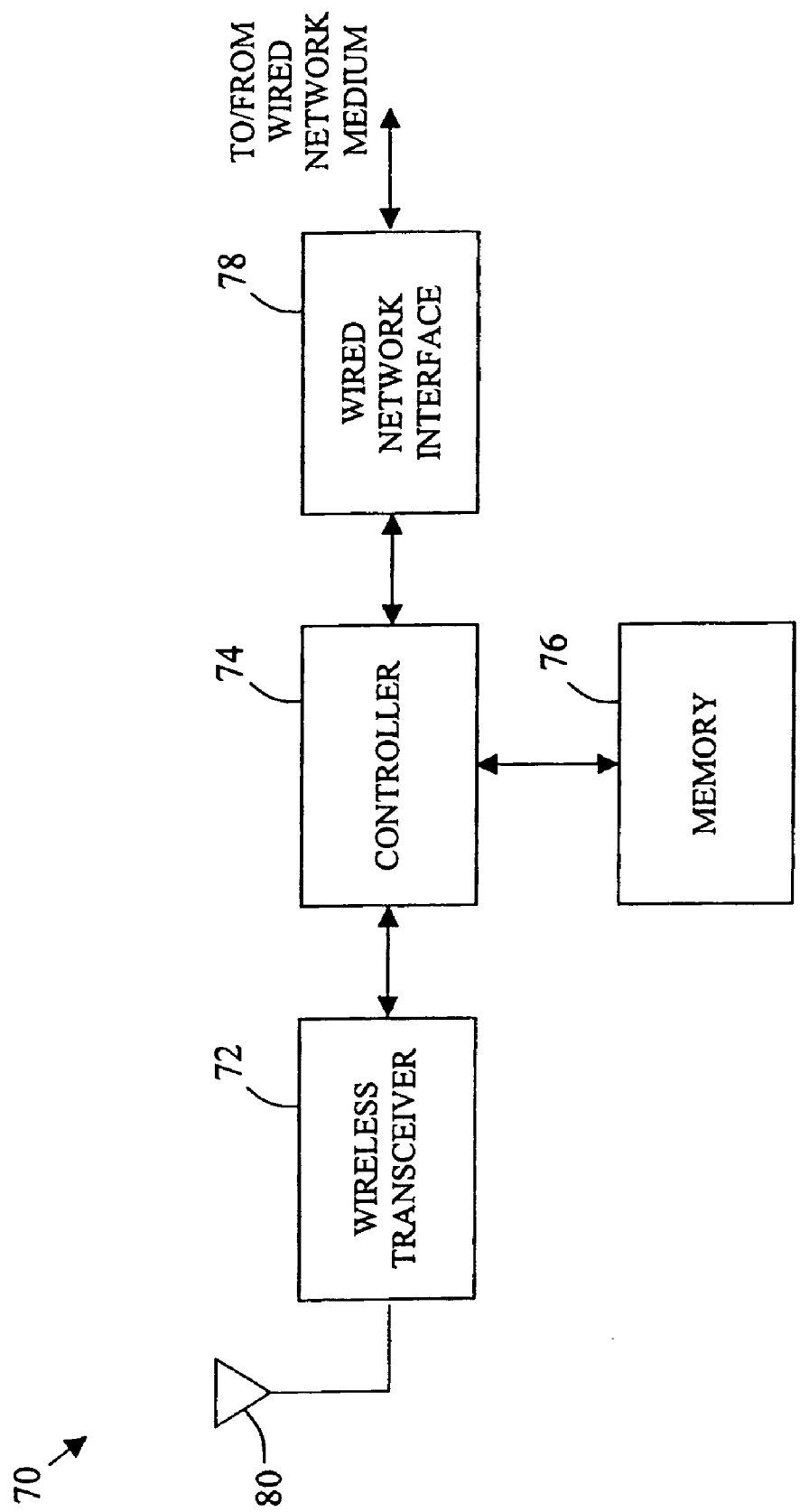
FIG. 3 is a block diagram illustrating an example wireless network device in accordance with an embodiment of the present invention.

FIG. 3 is a block diagram illustrating an example wireless network device 70 in accordance with an embodiment of the present invention. As illustrated, the network device 70 may include one or more of: a wireless transceiver 72, a controller 74, a memory 76, a wired network interface 78, and an antenna 80. The wireless transceiver 72 may be operative for supporting wireless communication with one or more external wireless client devices, via antenna 80. Antenna 80 can be any type of antenna including, for example, a dipole, a patch, a helix, an array, and/or others. In at least one embodiment, two or more antennas 80 are used. The wireless network device 70 may be capable of operating in accordance with one or more high throughput wireless networking standards. The wireless network device 70 may also (or alternatively) be capable of operating in accordance with one or more legacy wireless networking standards. The wired network interface 78 may provide an interface to a wired network medium. The controller 74 is operative for controlling the operation of the wireless network device 70. The controller 74 may include, for example, one or more digital processing devices that are capable of executing programs stored in the memory 76. The memory 76 may be an integral part of the controller 74 or a separate structure. In at least one embodiment of the invention, the memory 76 may include program instructions that are capable of implementing the method 30 of FIG. 1, or variants thereof, when executed by the controller 74. Similarly, the memory 76 may include program instructions that are capable of implementing the method 60 of FIG. 2, or variants thereof, when executed by the controller 74. As will be appreciated, the high throughput wireless network device 70 of FIG. 3 represents one possible device architecture that may be used in accordance with the invention. Many alternative architectures also exist.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method to select a channel of operation for a wireless network device from a plurality of supported channels, comprising:
    estimating a channel load of a first wireless network device;
    determining that a second wireless network device is currently using a first channel;
    calculating a first performance metric value to gauge the desirability of operating said first wireless network device within said first channel, wherein calculating said first performance metric value includes adding the estimated channel load of the first wireless network device to said first channel without moving an estimated channel load of said second wireless network device from said first channel to another channel;
    calculating a second performance metric value to gauge the desirability of operating said first wireless network device within said first channel, wherein calculating said second performance metric value includes adding the estimated channel load of the first wireless network device to said first channel and moving an estimated channel load of said second wireless network device from the first channel to another channel; and
    choosing a best performance metric value from a group that includes said first and second performance metric values.

2. The method of claim 1, wherein:
    calculating a first performance metric value includes calculating an aggregate throughput value, wherein aggregate throughput is the sum of the estimated throughputs of the supported channels.

3. The method of claim 2, wherein:
    calculating a second performance metric value includes calculating an aggregate throughput value.

4. The method of claim 1, further comprising:
    calculating a third performance metric value to gauge the desirability of operating said first wireless network device within a second channel, wherein calculating said third performance metric value includes adding the estimated channel load of the first wireless network device to the second channel without moving an estimated channel load of another wireless network device, if any, from the second channel, wherein said group includes said third performance metric value.

5. The method of claim 1, further comprising:
    calculating performance metric values that involve movement of a wireless network device for all supported channels that include at least one movable legacy device and no unmovable legacy devices, wherein said group includes said performance metric values.

6. The method of claim 1, further comprising:
    calculating performance metric values that do not involve movement of a wireless network device for all supported channels, wherein said group includes said performance metric values.

7. An apparatus comprising:
    a wireless transceiver; and a controller to select a channel of operation for said apparatus from a plurality of supported channels, said controller to:
  estimate a channel load of said apparatus;
  determine that a wireless network device is currently using a first channel;
  calculate a first performance metric value to gauge the desirability of operating said apparatus within said first channel, wherein calculating said first performance metric value includes adding the estimated channel load of said apparatus to said first channel without moving an estimated channel load of said wireless network device from said first channel to another channel;
  calculate a second performance metric value to gauge the desirability of operating said apparatus within said first channel, wherein calculating said second performance metric value includes adding the estimated channel load of said apparatus to said first channel and moving an estimated channel load of said wireless network device from the first channel to another channel; and
  choose a best performance metric value from a group that includes said first and second performance metric values.

8. The apparatus of claim 7, wherein:
calculation of a first performance metric value includes calculation of an aggregate throughput value, wherein aggregate throughput is the sum of the estimated throughputs of the supported channels.

9. The apparatus of claim 8, wherein:
calculation of a second performance metric value includes calculation of an aggregate throughput value.

10. The apparatus of claim 7, wherein:
said controller is to calculate a third performance metric value to gauge the desirability of operating said apparatus within a second channel, wherein calculating said third performance metric value includes adding the estimated channel load of said apparatus to the second channel without moving an estimated channel load of another wireless network device, if any, from the second channel, wherein said group includes said third performance metric value.

11. The apparatus of claim 7, wherein:
said controller is to calculate other performance metric values that involve movement of a wireless network device for all supported channels that include at least one movable legacy device and no unmovable legacy devices, wherein said group includes said other performance metric values.

12. The apparatus of claim 7, wherein:
said controller is to calculate other performance metric values that do not involve movement of a wireless network device for all supported channels, wherein said group includes said other performance metric values.

13. An article comprising a computer readable storage medium having instructions stored thereon that, when executed by a computing platform, operate to:
  estimate a channel load of a first wireless network device;
  determine that a second wireless network device is currently using a first channel in a plurality of supported channels in a wireless network;
  calculate a first performance metric value to gauge the desirability of operating said first wireless network device within said first channel, wherein calculating said first performance metric value includes adding the estimated channel load of the first wireless network device to said first channel without moving an estimated channel load of said second wireless network device from said first channel to another channel;
  calculate a second performance metric value to gauge the desirability of operating said first wireless network device within said first channel, wherein calculating said second performance metric value includes adding the estimated channel load of the first wireless network device to said first channel and moving an estimated channel load of said second wireless network device from the first channel to another channel; and
  choose a best performance metric value from a group that includes said first and second performance metric values.

14. The article of claim 13, wherein:
calculation of a first performance metric value includes calculation of an aggregate throughput value, wherein aggregate throughput is the sum of the estimated throughputs of the supported channels.

15. The article of claim 14, wherein:
calculation of a second performance metric value includes calculation of an aggregate throughput value.

16. The article of claim 13, wherein said instructions further operate to:
  calculate a third performance metric value to gauge the desirability of operating said first wireless network device within a second channel, wherein calculation of said third performance metric value includes addition of the estimated channel load of the first wireless network device to the second channel without movement of an estimated channel load of another wireless network device, if any, from the second channel, wherein said group includes said third performance metric value.

17. The article of claim 13, wherein said instructions further operate to:
  calculate performance metric values that involve movement of a wireless network device for all supported channels that include at least one movable legacy device and no unmovable legacy devices, wherein said group includes said performance metric values.

18. The article of claim 13, wherein said instructions further operate to:
  calculate performance metric values that do not involve movement of a wireless network device for all supported channels, wherein said group includes said performance metric values.

19. A system comprising:
  at least one dipole antenna;
  a wireless transceiver coupled to said at least one dipole antenna; and
  a controller to select a channel of operation for said system from a plurality of supported channels, said controller to:
    estimate a channel load of said system;
    determine that a wireless network device is currently using a first channel in said plurality of supported channels;
    calculate a first performance metric value to gauge the desirability of operating said system within said first channel, wherein calculating said first performance metric value includes adding the estimated channel load of said system to said first channel without moving an estimated channel load of said wireless network device from said first channel to another channel;

calculate a second performance metric value to gauge the desirability of operating said system within said first channel, wherein calculating said second performance metric value includes adding the estimated channel load of said system to said first channel and moving an estimated channel load of said wireless network device from the first channel to another channel; and choose a best performance metric value from a group that includes said first and second performance metric values.

20. The system of claim 19, wherein:

calculation of a first performance metric value includes calculation of an aggregate throughput value, wherein aggregate throughput is the sum of the estimated throughputs of the supported channels.

21. The system of claim 20, wherein:

calculation of a second performance metric value includes calculation of an aggregate throughput value.

22. The system of claim 19, wherein:

said controller is to calculate a third performance metric value to gauge the desirability of operating said system within a second channel, wherein calculating said third performance metric value includes adding the estimated channel load of said system to the second channel without moving an estimated channel load of another wireless network device, if any, from the second channel, wherein said group includes said third performance metric value.

23. The system of claim 19, wherein:

said controller is to calculate other performance metric values that involve movement of a wireless network device for all supported channels that include at least one movable legacy device and no unmovable legacy devices, wherein said group includes said other performance metric values.

24. The system of claim 19, wherein:

said controller is to calculate other performance metric values that do not involve movement of a wireless network device for all supported channels, wherein said group includes said other performance metric values.

\* \* \* \* \*